United States Patent [19]

Dotsko

[11] 3,903,615
[45] Sept. 9, 1975

[54] VISUAL DISPLAY APPARATUS
[75] Inventor: Martin Dotsko, Binghamton, N.Y.
[73] Assignee: The Singer Company, New York, N.Y.
[22] Filed: Sept. 13, 1973
[21] Appl. No.: 397,148

[52] U.S. Cl............................... 35/12 N; 350/96 C
[51] Int. Cl.².......................... G09B 9/08; B64G 7/00
[58] Field of Search.................... 35/10.2, 11, 12 N; 40/28 C, 52 R, 130 D, 130 E, 130 K, 130 L; 240/1 R, 1 EL, 1 LP, 1.2, 2.1, 10.2; 340/336, 324 R, 380, 26; 350/96 R, 96 B, 96 C

[56] References Cited
UNITED STATES PATENTS

| | | | |
|---|---|---|---|
| 3,532,873 | 10/1970 | Batson et al. | 240/8.4 |
| 3,573,813 | 4/1971 | Burns et al. | 340/380 |
| 3,623,240 | 11/1971 | Wood | 35/12 N |
| 3,715,822 | 2/1973 | Hansen et al. | 40/130 K |

Primary Examiner—Robert W. Michell
Assistant Examiner—Vance Y. Hum
Attorney, Agent, or Firm—Jeffrey Rothenberg; James C. Kesterson

[57] ABSTRACT

Optical fibers which protrude through a base plate to simulate airfield lights in a closed-circuit television visual display are accurately and securely yet removably positioned with a desired angular orientation and a desired protrusion by means of attached keying or aligning pins which register with a key plate. The key pins are attached to the optical fibers using heat-shrinkable tubing. The other ends of the fibers also may be accurately positioned using heat-shrinkable tubing.

12 Claims, 8 Drawing Figures

VISUAL DISPLAY APPARATUS

One type of visual display system which has gained widespread usage with flight simulators comprises a closed-circuit television system in which a television camera is moved relative to a runway and terrain model as the trainee pilot "flies" the simulated aircraft. Such models are created with much detail in order to realistically simulate airport conditions, and simulated runway lights are required to simulate dusk and night-time operations. The models generally comprise flat plates upon which one or more airport runways and surrounding grass are painted, and upon which miniature airport buildings and the like may be mounted. The simulated lights, some of which usually must be switched on and off or otherwise varied, have frequently comprised a plurality of optical fibers which protrude upwardly through holes in the flat plate, with a light source arranged to controllably apply light to the other ends of the fibers below the plate. The problems which have attended the construction and use of such model lighting systems have included poor light transmission and difficulties in making simulated lights as small as they should be. Also, prior art optical fiber model lighting systems have been tedious and difficult to install, and to maintain or repair, such as when one or more optical fibers has been broken.

An improved optical fiber model lighting system disclosed in an application Ser. No. 397,147 of R. A. Mecklenborg filed on even date herewith and assigned to the same assignee as the present invention provides a vast improvement in light transmission over prior systems by suitably grinding and polishing the end of each optical fiber to render the light projection from each fiber highly directional. However, because the light projection is highly directional, it becomes extremely important that the angular orientation of the light-projecting end of each fiber be very accurately established and precisely maintained, which would be very difficult using prior art fiber-mounting techniques. In order that each group of similar simulated lights appear to have the same size, it is also necessary that the amount which each fiber protrudes above the simulated runway surface be very precisely controlled. The scale reduction used with most camera-model visual systems requires that the light-projecting end of each fiber not protrude above the runway surface more than about 0.015 to 0.030 inch. The difficulty of poking many very thin, generally cylindrical, flexible fibers through small holes in the runway plate so that they have a precise angular orientation and a precise protrusion above the surface is manifest, as is the difficulty of maintaining precise angular orientation and protrusion after the fibers have been installed. Maintaining the fibers with a precise angular orientation and a precise protrusion is further complicated by the fact that it is highly desirable that each fiber be removable or replaceable, since the small diameter of the fibers tends to make them susceptible to breaking, and even in the absence of breakage it often becomes desirable to change simulated runway lights to reflect changes in the actual lighting system at an actual airfield. The requirement that fibers be removable tends to rule out the use of cement or glue to maintain them in place in the model runway plate. Thus it is a primary object of the present invention to provide an improved optical fiber mounting arrangement which allows the ends of optical fibers to be accurately but removably fixed in a runway model with precisely-controlled angular orientation and protrusions above the model runway surface.

Another object of the present invention is to provide an improved optical fiber mounting arrangement which lends itself to easy installation and removal of fibers to and from the model, in the field, without a requirement for special tools.

In accordance with a central concept of the present invention, each fiber is provided adjacent its end with a short length of rod which is clamped to the fiber to act as a key, giving each fiber-rod assembly a non-circular cross-section. The fiber and its associated key rod pass through holes in a key plate mounted on the underside of the runway plate, and with the key plate aligned relative to the runway plate, the angular orientation of the fibers relative to the runway plate is accurately fixed. Each key rod also butts against the undersurface of the runway plate, thereby limiting and accurately determining the protrusion of the fiber end above the upper surface of the runway plate. Further, the friction between the fiber and the key rod and the key plate serve to securely maintain the fiber in its proper installed position without a need for cement, glue or other clamping means, so that each fiber may be readily removed if desired.

In order that simulated lights have the proper simulated size, it is necessary that glass fibers of small diameter be used. The small diameters of the fibers and their stiffness or limited resilience tends to make them delicate and easily susceptible to breakage. One object of the invention is to provide an optical fiber mounting arrangement which facilitates easy installation and removal of fibers and precise positional fixing of fiber ends by means which do not tend to apply forces to the fibers which might break them.

Other objects of the invention will in part be obvious and will in part appear hereinafter.

The invention accordingly comprises the features of construction, combinations of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
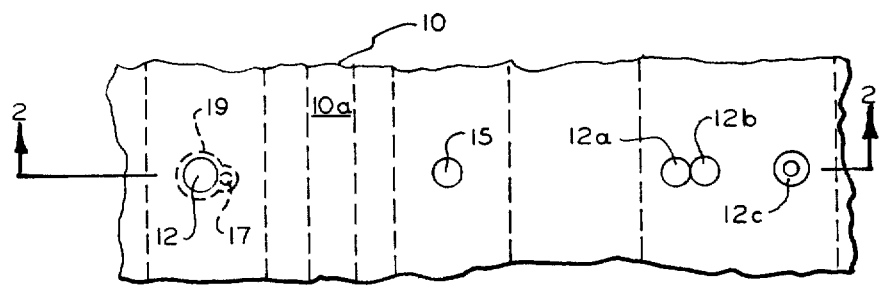
FIG. 1 is a plan view of a portion of the upper surface of a runway model showing a plurality of optical fibers protruding therefrom to simulate various airfield lights.
Figure 2:
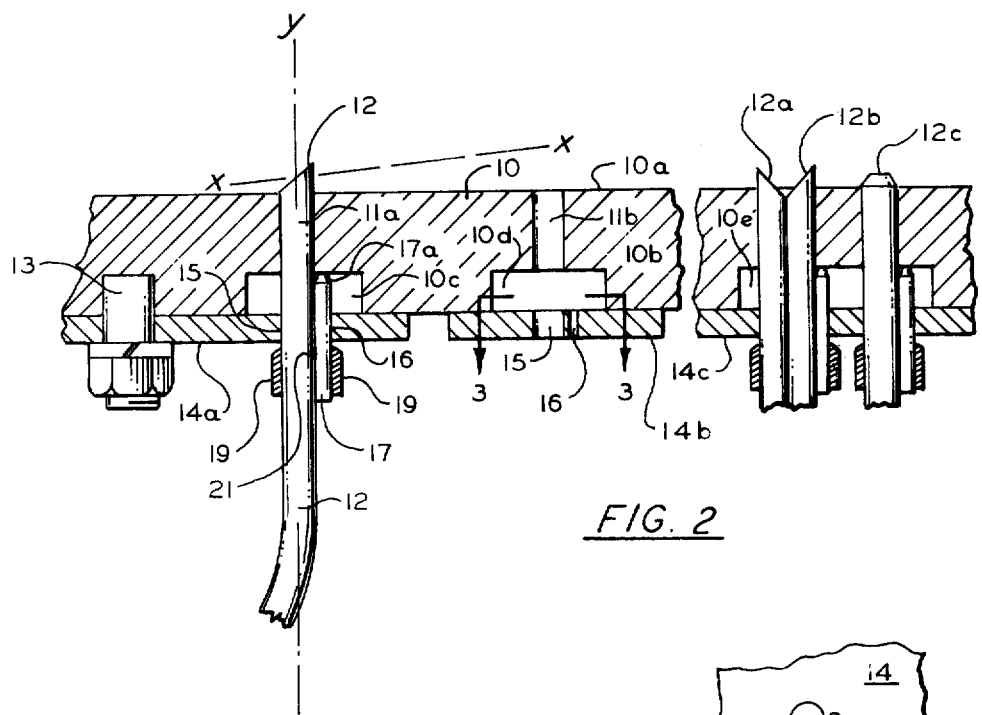
FIG. 2 is a cross-section elevation view of the runway model portion of FIG. 1 taken at lines 2—2 in FIG. 1.
Figure 3:
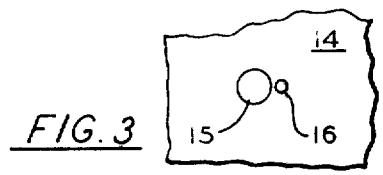
FIG. 3 is a view taken at lines 3—3 in FIG. 2.

Referring now to FIGS. 1–3, reference numeral 10 indicates a portion of a flat runway plate which typically comprises a metal plate, e.g., aluminum, typically of the order of three-eights inch thick. The size of the plate varies depending upon the scale selected for the model and the amount of surrounding airfield terrain to be included in the model, but in typical applications plate 10 might have a width of 15 feet and a length of 50 feet. The plate is fixedly mounted by means not shown, and a television camera (not shown) is maneuvered relative to the runway plate in conventional fashion by means not shown. The camera views surface 10a of plate 10, and a simulated runway and surrounding grass is painted on surface 10a. Surface 10a will be termed the upper surface of plate 10 for sake of convenience. It is to be understood, however, that runway models are sometimes mounted on one side, so that surface 10a would extend approximately vertically.

To provide a row of simulated lights, a plurality of holes, 11, 11 are drilled through runway plate 10, each hole extending into a recess such as 10c, 10 d milled or otherwise provided on the lower side 10b of plate 10. In FIGS. 1 and 2 a flexible generally-cylindrical glass optical fiber 12 is shown extending through one hole 11a, and hole 11b is shown empty, as it would be prior to the installation of such a fiber. In a typical application each optical fiber will have a small diameter of the order of 0.015 to 0.030 inch, and a length of perhaps several feet, and in FIGS. 1 and 2 fiber 12 is shown with an exaggerated size relative to the thickness of plate 10 for clarity of illustration. The upper end of the fiber 12 is ground and polished at a precise angle relative to the longitudinal axis $y-y$ of the fiber, as described in the above-mentioned Mecklenborg application, which results in very directional projection of light from the end of the fiber. For example, if the polished surface of the fiber end extends at an angle such as 46.5° relative to surface 10a, the light will be projected from the fiber mainly along an axis $x-x$, which may extend in the direction of a simulated glide slope. Provision of the polished flat surface on the end of fiber 12 also makes the projected light beam from the fiber very directional in the sense that angular orientation of the fiber end about the longitudinal axis $y-y$ becomes quite critical. Furthermore, in order that the simulated runway light have the proper size when viewed by the camera, it is usually necessary that only a very small portion of the fiber protrude above surface 10a, usually an amount not exceeding the diameter of the fiber.

In accordance with the present invention, one or more keying or alignment plates 14a, 14b are provided below runway plate 10, preferably to be mounted against lower surface 10b of plate 10, and means are provided to align each keying plate with the runway plate. In FIG. 2 an alignment pin 13 staked in runway plate 10 passes through a bore in key plate 14a. The lower end of pin 13 is threaded to accommodate a lockwasher and nut. A plurality of such pins may align each keying plate with the runway plate. Each keying plate includes a pair of circular holes 15, 16 for each optical fiber to be mounted. The hole 15 in each keying plate has the same diameter as and registers with a respective hole 11 through runway plate 10, and spaced adjacent each hole 15 is an associated keying hole 16, as best seen in FIGS. 2 and 3. Each key plate is preferably used as a template for drilling the holes in the runway plate, to insure registration of each hole 11 with a respective hole 15. As seen in FIG. 2, when fiber 12 is installed, it extends through a hole 15 in a keying plate 14 and through hole 11 in plate 10, and a keying pin 17 fixedly attached to the fiber 12 extends through associated keying hole 16, with the upper end of pin 17 butted against the roof of recess 10c. Each keying pin 17 preferably comprises a short length of metal (e.g., brass) pin preferably having a beveled upper end as shown at 17a to facilitate its entry into the keying hole 16 through which it extends, and in one embodiment of the invention brass pins having a diameter of 0.020 inch were utilized. Each keying pin is preferably affixed to its associated optical fiber 12 by means of a short section of heat-shrinkable plastic tubing 19. Various types of plastic tubing are commercially available in heat-shrinkable form, including, for example polyolefin, polyvinylidene fluoride, polytetrafluorethylene, polyvinyl chloride and neoprene. To affix a keying pin to a fiber, a loosely-fitting section of tubing is placed around a fiber and a keying pin in a jig or clamping means (not shown), the fiber is then rotated and shifted so that light is projected from the fiber at a given angle and a given position relative to the end of the keying pin, as observed through a suitable magnifier, and then heat is applied to the tubing to fixedly clamp the keying pin and fiber together. If desired, a drop of cement may be added, as at 21, to further bind the pin to the fiber, to insure a permanent positioning of the pin relative to the fiber even in the event of some long-term creep in the heat-shrunk plastic tubing.

In an actual reduction to practice, the distance between the roof of a recess in a runway plate and the upper surface of said plate was precisely measured using a plug gauge and a depth micrometer. The desired protrusion of an optical fiber beyond the upper surface of the runway plate was then added to this measured distance to obtain the required separation between the end of the fiber and the tip of a keying pin. With the aid of a measuring microscope having a filar measuring eyepiece, the end of the optical fiber was positioned with the required separation and desired angular orientation relative to the keying pin. The fiber and keying pin were then affixed using heat-shrinkable plastic tubing. Of course, other equivalent means and techniques can be employed to accurately construct a fiber-key pin assembly.

To install a fiber-key pin assembly, it is merely pushed upwardly through its associated key plate, with its pin 17 entering a hole 16, and the fiber passing first through a hole 15 and then a hole 11, with upward motion of the fiber assembly being terminated when the upper end of the key pin strikes the roof of the recess in plate 10.

Figure 4:
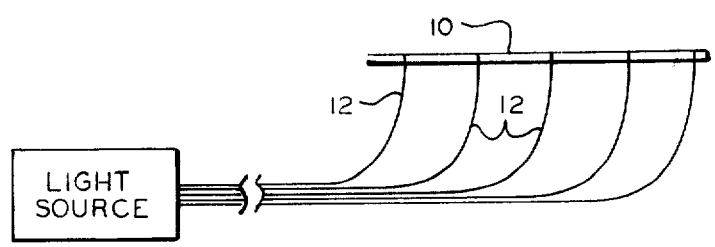
FIG. 4 is a side view elevation generally illustrating a manner in which a plurality of optical fibers extend between a runway model plate and a light source.

The holes 15 and 16 in each keying plate very slightly exceed the diameters of the fiber and keying pins, respectively. Once a fiber has been installed in the manner shown in FIG. 2, the friction of the fiber and keying pin in holes 15 and 16 of the key plate 14, and the natural stiffness of the fiber hold the fiber in place. In FIG. 3 it may be noted that while holes 15 and 16 in key plate 14 are spaced closely together, they do not overlap or intersect, so that a thin portion of metal exists between the holes. It will be seen that that thin portion of metal will enter between the fiber and the key pin when the assembly is installed tending to spread them apart, with such spreading resisted by tension in the tubing 19 and the cement 21, thereby increasing the friction which holds the assembly in place. In some embodiments such added friction is not necessary, and holes 15 and 16 can slightly overlap, if desired. Also, while the diameters of each hole 16 and key pin 17 are shown as being less than the diameters of each hole 11 and fiber 12, a converse arrangement, or an arrangement using similar diameters, may be used if desired. Fiber 12 in FIG. 2 is shown with a lower portion bent away from axis y—y, and in practice a group of fibers representing different runway lights are bent or trained into a bundle with their lower ends accurately positioned relative to one or more light sources. Such an arrangement is generally shown in FIG. 4. The bending of each fiber will be seen to increase the friction acting between the fiber and key pin and the keying plate and runway plate 10 due to the stiffness of the fiber, thereby helping hold each fiber end securely in place but allowing each fiber to be removed from the runway plate if it is deliberately pulled downwardly.

In FIGS. 1 and 2 optical fibers 12a and 12b placed back to back to form a simulated two-directional light are positioned by a keying pin which is affixed to both fibers by heat-shrunk tubing, and optical fiber 12c is formed with a truncated conical end to form a simulated omnidirectional light and installed in runway plate 10 in similar fashion. While the angular orientation of fiber 12c about the vertical axis is unimportant, it will be seen that the key pin attached to fiber 12c does serve the important purpose of fixing the distance which fiber 12c extends above surface 10a, and provides friction to hold fiber 12c in place. It also should be noted that plural optical fibers may extend through each recess, such as 10e, provided in the bottom of plate 10. It also is important to note that the provision of bottom recesses such as 10c, 10d, 10e is not strictly necessary in order to practice the invention, and that if such recesses are omitted, the upper end of each key pin can butt against the lower surface 10b of runway plate 10. Indeed, it can be seen that each hole 16 need not extend all the way through its key plate, but only into the key plate far enough for the pin 17 to securely seat. It is preferred, however, that each hole 16 extend through its key plate, to obviate any need for drilling the holes 16 with accurately controlled depths.

Figure 5:
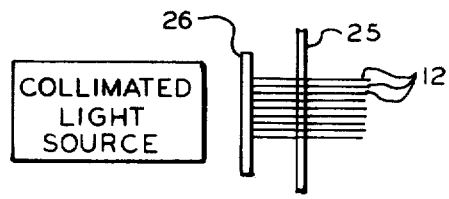
FIGS. 5 and 6 are side view diagrams illustrating two arrangements by means of which the light source ends or input ends of optical fibers may be positioned.
Figure 6:
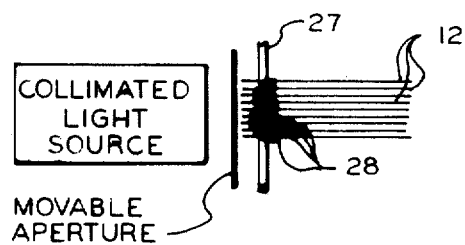

As well as accurately locating the output or light-projecting end of each fiber, it is desirable in most applications and vitally necessary in some applications, that the source or input end of each fiber be precisely fixed. For example, in order to insure uniform illumination of a plurality of fibers representing identical runway lights, it is necessary in the system of the above-mentioned application that the input ends of all such fibers lie in a common plane. In some applications a group of fiber input ends may butt against a glass plate, which in some applications may comprise a color filter, with light being applied to the fibers through the glass plate in the manner shown in cross-section in FIG. 5. In FIG. 5 each fiber 12 extends through a respective hole in a fixed metal plate 25 and butts against glass plate 26 which is shown spaced a fixed distance from metal plate 25, although glass plate 26 may seat against metal plate 25, if desired. In some applications it is desirable that such a glass plate be eliminated in order that a fixed or movable aperture be located adjacent the ends of the fibers, as shown in FIG. 6. In order that each fiber extend a predetermined distance beyond the metal plate 27 in FIG. 6, a short length of heat-shrunk tubing 28 surrounds each fiber to butt against plate 27 and act as a stop. It will be apparent that a key pin (not shown) may be affixed to each fiber by bent shrinkable tubing near the end of each fiber, so that each such key pin butts against the rear face of plate 27 to limit the distance which each fiber extends beyond plate 27, thereby placing all of the fiber ends in a common plane. It will be apparent that bundling the fibers together on the right hand side of plate 25 in FIG. 5 or plate 27 in FIG. 6 tends to bend each fiber where it enters the metal plate, providing friction serving to hold the fiber in place. It will be apparent that the fibers may be bundled by means of a cord or flexible strap or the like.

Figure 7:
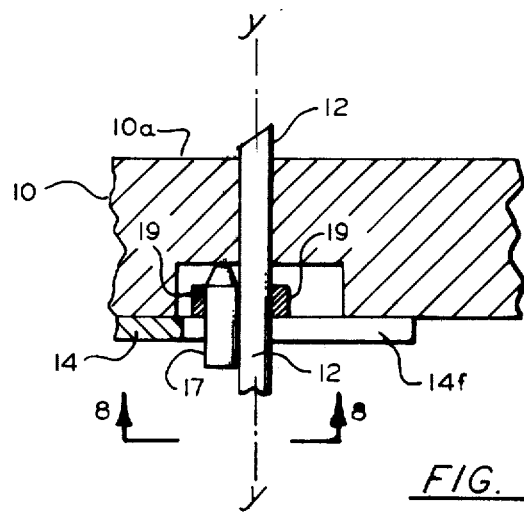
FIG. 7 is a side view generally similar to FIG. 2 illustrating a modified arrangement.
Figure 8:
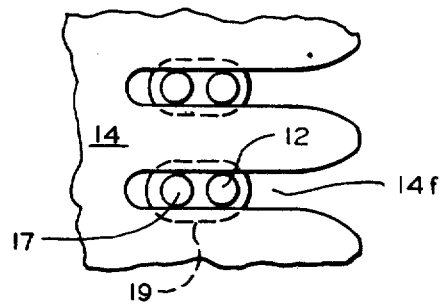
FIG. 8 is a view taken at lines 8—8 in FIG. 7.

FIGS. 7 and 8 illustrate a modified arrangement generally similar to FIG. 2, except that the heat-shrunk tubing is placed on the fiber so that it rests atop keying plate 14 when the fiber is installed. The keying plate is formed in comb-like fashion so that it may be moved sidewise after the fibers have been installed in the runway plate. Such an arrangement may be preferable in applications where the fiber may be subject to accidental downward pulling. In FIGS. 7 and 8 keying pin 17 is provided with the same diameter as fiber 12, so that passage of the fiber and keying pin through slot 14f in key plate 14 fixes the angular orientation of the fiber about axis y—y in FIG. 7. As in the previously-described arrangement keying pin 17 limits upward protrusion of fiber 12.

It will be apparent that one keying plate or several separate keying plates may be used to key the various fibers used for a complete simulated runway lighting system, and while a given keying plate ordinarily will accommodate a plurality of optical fibers, particularly where the fibers must be spaced closely together to simulate closely-spaced lights in a given row, widely spaced apart lights may be simulated by fibers having individual key plates.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Apparatus for use in simulating airfield lighting comprising, in combination:
   a first plate member having a representation of an airfield on a first of its sides and a through hole;
   a second plate member disposed on the opposite side of said first plate member, said second plate member having a through first hole registering with said hole through said first plate member and a second hole adjacent to said through first hole;
   an optical fiber having a longitudinal axis and an output end representing an airfield light, said fiber extending through said first hole in said second plate member and said hole through said first plate member so that said output end of said fiber extends beyond said first side of said first plate member; and
   a pin affixed to said fiber with a predetermined separation and angular orientation relative to the output end of said fiber, said pin extending into said second hole in said second plate member to limit rotational movement of said fiber about its longitudinal axis and to limit the extension of said output end of said fiber, whereby said output end is precisely located.

2. Apparatus according to claim 1 having means for applying light to the opposite end of said fiber.

3. Apparatus according to claim 1 wherein said second plate member lies against said opposite side of said first plate member.

4. Apparatus according to claim 1 wherein said second hole extends through said second plate member and one end of said pin butts against said opposite side of said first plate member.

5. Apparatus according to claim 1 wherein said first and second holes in said second plate member comprise circular holes with centers spaced apart a distance exceeding the sum of their radii.

6. Apparatus according to claim 1 having heat-shrunk tubing surrounding a portion of said fiber and said pin to affix said pin to said fiber.

7. Apparatus according to claim 1 wherein said first plate member comprises a flat plate and said hole extends through said first plate member perpendicularly to the plane of said first plate member.

8. Apparatus according to claim 1 wherein said first plate member has a recess on said opposite side and said pin extends through said second hole into said recess.

9. Apparatus according to claim 1 having a second optical fiber affixed to said optical fiber and extending through said hole in said first plate member and said first hole in said second plate member.

10. Apparatus according to claim 1 wherein said optical fiber comprises a semi-flexible generally-cylindrical glass fiber having said end formed as a light reflective flat surface at an acute angle to the axis of said fiber.

11. Apparatus for use in simulating airfield lighting comprising:
a first plate member having a representation of an airfield on a first of its sides and a through hole extending from said first side to an opposite side;
an optical fiber having a longitudinal axis, said fiber extending through said hole in said first plate member so that an end of said fiber protrudes beyond said first surface;
a keying element affixed to said optical fiber at a predetermined distance and angular orientation relative to said fiber end, said keying element abutting against said first member to limit the extent of protrusion of said fiber end; and
means, associated with said first plate member, for receiving said keying element, and, in cooperation with said keying element, limiting rotational movement of said fiber about its longitudinal axis, whereby the end of said fiber is positioned with a precise angular orientation and predetermined protrusion relative to said first side of said first plate member.

12. The apparatus of claim 11 wherein said means for receiving said keying element comprises a second plate member positioned adjacent the opposite side of said first plate member, said second plate member having a configuration which permits said fiber and said keying element to extend therethrough but limits rotational movement of said fiber about its longitudinal axis.

* * * * *